(12) United States Patent
Graves et al.

(10) Patent No.: US 6,675,587 B2
(45) Date of Patent: Jan. 13, 2004

(54) COUNTER SWIRL ANNULAR COMBUSTOR

(75) Inventors: Charles B. Graves, South Windsor, CT (US); Michael S. Ondas, East Hampton, CT (US); Jason W. Norris, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/104,093

(22) Filed: Mar. 21, 2002

(65) Prior Publication Data

US 2003/0177769 A1 Sep. 25, 2003

(51) Int. Cl.[7] .............. F02C 7/00; F23R 3/06; F23R 3/12; F23R 3/50
(52) U.S. Cl. .............. 60/804; 60/748; 60/752
(58) Field of Search .............. 60/752, 754, 755, 60/756, 757, 748, 804

(56) References Cited

U.S. PATENT DOCUMENTS

| | | | | |
|---|---|---|---|---|
| 2,448,562 A | * | 9/1948 | Way et al. ............ | 60/752 |
| 2,543,755 A | * | 3/1951 | Berger ............ | 60/752 |
| 3,099,134 A | * | 7/1963 | Calder et al. ............ | 60/752 |
| 3,645,095 A | * | 2/1972 | Melconian ............ | 60/804 |
| 4,151,709 A | * | 5/1979 | Melconian et al. ............ | 60/804 |
| RE30,160 E | * | 11/1979 | Emory, Jr. et al. ............ | 60/752 |
| 4,301,657 A | * | 11/1981 | Penny ............ | 60/748 |
| 4,733,538 A | * | 3/1988 | Vdoviak et al. ............ | 60/752 |
| 4,928,479 A | * | 5/1990 | Shekleton et al. ............ | 60/804 |
| 4,949,545 A | * | 8/1990 | Shekleton ............ | 60/756 |
| 5,109,671 A | * | 5/1992 | Haasis ............ | 60/804 |
| 5,590,530 A | | 1/1997 | Owen et al. ............ | 60/748 |
| 6,070,412 A | * | 6/2000 | Ansart et al. ............ | 60/752 |
| 6,260,359 B1 | * | 7/2001 | Monty et al. ............ | 60/752 |

* cited by examiner

*Primary Examiner*—Ted Kim
(74) *Attorney, Agent, or Firm*—Linda A. P. Cunha

(57) ABSTRACT

An annular combustor suitable for use in a gas turbine engine having a plurality of fuel injectors and a plurality of apertures circumferentially arranged within the inner and outer liners of the combustion chamber is disclosed. Further, each of the apertures of the inner liner are disposed on one side of the centerline of each of the fuel injectors and each of the apertures of the outer liner are disposed on the opposing side of the centerline of each of the fuel injectors. In this way, air exhausted from the apertures advantageously opposes the direction of swirl of the fuel and air mixture that is injected from the fuel injectors thereby providing enhanced mixing of the fuel and air within the combustion chamber, increased residence time and the reduction of hot streaks in the inner and outer liners.

12 Claims, 8 Drawing Sheets

COUNTER SWIRL ANNULAR COMBUSTOR

The Government has rights in this invention, pursuant to Contract No. N00019-01-C-0132 awarded by the Naval Air Systems Command and may also have rights pursuant to Contract No. N00140-86-C-9417 awarded by the Department of Navy.

TECHNICAL FIELD

This invention relates to combustors for a gas turbine and in particular to the efficient mixing of fuel and air within the combustor.

BACKGROUND OF THE INVENTION

In a typical gas turbine engine, the working medium gases are flowed into the combustor where they are mixed with fuel. The combustor provides a combustion chamber where the fuel and air mixture is burned as thoroughly as possible. In an annular combustor, the fuel is metered and injected into the combustor by multiple nozzles along with combustion air having a designated amount of swirl.

To facilitate mixing of the air and fuel mixture as the combustion gases move downstream in the combustion chamber, a plurality of cross-flow apertures are used within the outer and inner liners of the combustor. These apertures introduce additional air (air jets) into the combustion chamber downstream of the fuel nozzles. Generally, the manner in which typical annular three and two zone combustors mix the fuel and air will be mentioned below. Annular combustors employ annular rows of holes within the outer and inner liners, respectively. Referring to FIG. 1, in a three zone combustor (two stage air admission) having primary, intermediate and dilution zones, there is generally a first row of holes in the outer liner and a corresponding first row of holes in the inner liner. There is also a second row of holes in the outer liner and a corresponding second row of holes in the inner liner. The second rows of holes in the inner and outer liners are downstream of the first rows of holes in the outer and inner liners. The first rows of holes reduce the formation of the hot streaks while the second rows of holes facilitate an exit temperature profile acceptable to gas turbine engine rotor design. The overall length of the combustor can be reduced, which has been heretofore recognized. Such a reduction in overall length is accomplished by eliminating one of the air admission stages. Thus, a two zone combustor design (single stage air admission), having primary and dilution zones, does not employ the second rows of holes. Therefore, the air jets from the first rows of holes in the outer and inner liners cool the center of the combustor. Unfortunately, as a consequence of having only the first rows of holes, hot streaks can form along the walls of the inner and outer liners or in the gaps between the jets.

If thorough mixing is not achieved during combustion of the mixture, the result will be a non-uniform temperature variation of the combustion products as they exit the combustor. Consequently, the downstream gas turbine parts, such as the first stage turbine vanes, are subjected to localized overheating. This overheating has the effect of degrading the durability of the downstream gas turbine parts. Further, this overheating of the downstream gas turbine parts requires increased cooling air to compensate for the overheating. Consequently, this increase of cooling air supplied to downstream gas turbine parts decreases overall gas turbine efficiency.

Therefore, what is needed is a combustor apparatus that more thoroughly mixes the fuel and air mixture with the results being an enhanced uniform exit temperature distribution thus eliminating hot streaks in the turbine.

SUMMARY OF THE INVENTION

The above discussed and other drawbacks and deficiencies are overcome or alleviated by the present invention.

Accordingly, the present invention provides a combustion apparatus for a gas turbine engine with enhanced mixing of the combustion gases (fuel and air mixture) within the combustion chamber and a reduction of peak temperatures at the exit plane of the combustion chamber. Thus, the apparatus described herein provides a more uniform temperature distribution that reduces the formation of hot streaks and advantageously cools the inner and outer liners of the combustion chamber.

In accordance with the present invention, the apparatus includes an annular combustion chamber having an inner liner and an outer liner coaxially disposed relative to each other to form a combustion zone therebetween. A plurality of fuel injectors is configured to swirl the fuel and air mixture injected therefrom into the combustion zone. The inner liner includes a plurality of apertures circumferentially arranged. Similarly, the outer liner includes a plurality of apertures circumferentially arranged. The apertures are spaced apart circumferentially along the respective inner and outer liners. Further, the apertures in the outer liner are circumferentially positioned such that there is only one such aperture between each of the fuel injectors. Similarly, the apertures in the inner liner are circumferentially positioned such that there is only one such aperture between each of the fuel injectors. In this way, the air jets exhausted into the combustion chamber from the apertures located in both the inner and outer liners advantageously oppose the direction of swirl of the fuel and air mixture that is injected from each of the fuel injectors. Thus, the fuel and air mixture is thoroughly mixed with the results being an enhanced uniform exit temperature distribution thus eliminating hot streaks in the turbine.

Also, the air jets exhausted from the apertures traverses the combustion zone to impinge the respective opposing liners. In the preferred embodiment, the apertures are elliptical in shape offering enhanced air penetration into the combustion zone and enhanced mixing of the air jets with the fuel and air mixture to provide an improved exit temperature profile.

The above discussed and other features and advantages of the present invention will be appreciated and understood by those skilled in the art from the following drawings and detailed description.

BRIEF DESCRIPTION OF THE DRAWINGS

The present invention will now be described, by way of example, with reference to the accompanying FIGS., in which.

DETAILED DESCRIPTION OF THE INVENTION

Figure 2:
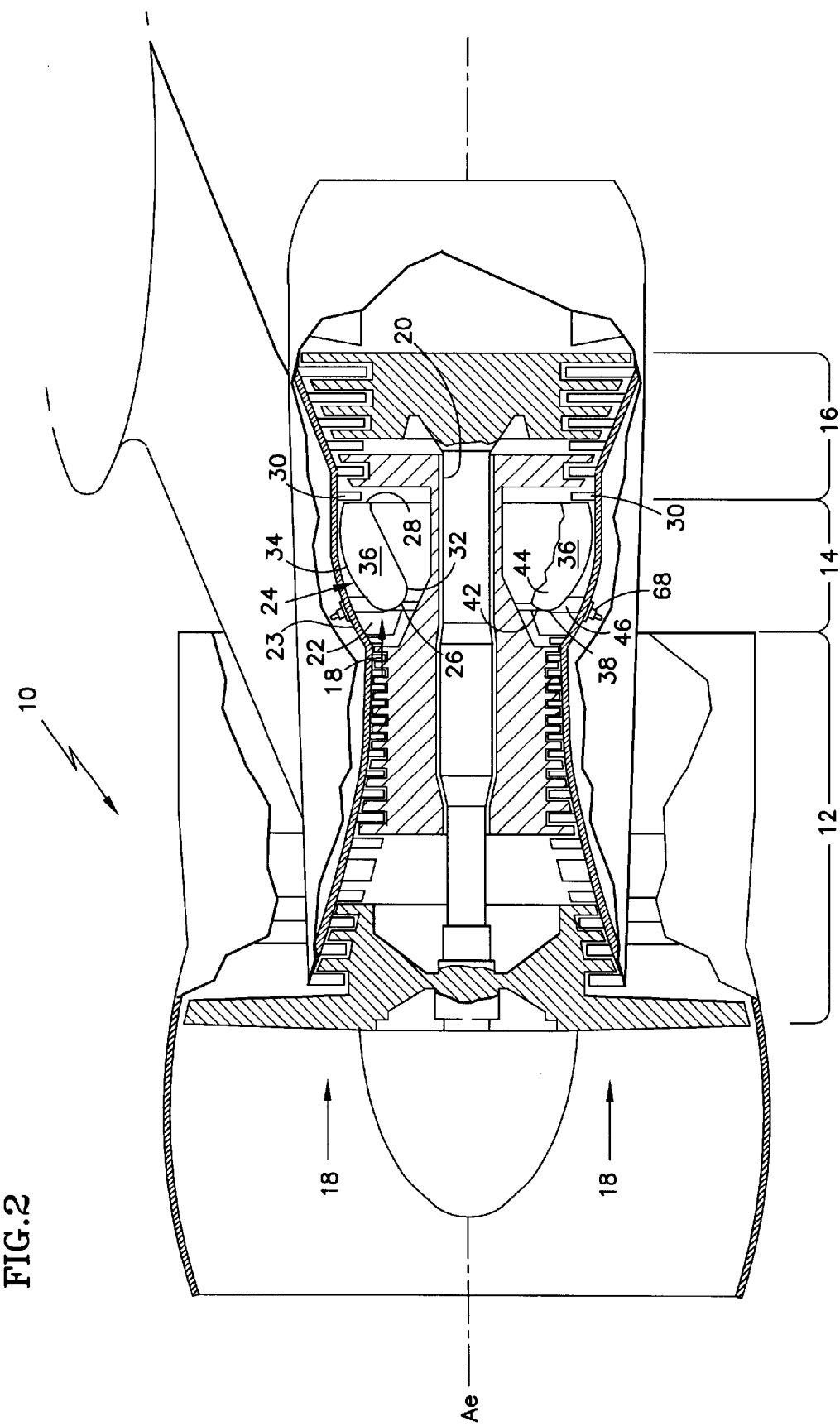
FIG. 2 is a side elevation, schematic view of a power plant for an aircraft and shows a portion of the wing of an aircraft, a pylon extending from the wing, a nacelle and a gas turbine engine disposed in the nacelle.

FIG. 2 is a schematic representation of a twin spool axial flow, rotary machine, such as a gas turbine engine (engine) 10. The engine includes a compression section 12, a combustion section (combustor, combustion apparatus) 14, and a turbine section 16. The sections 12, 14, 16 are disposed about an axis of rotation, $A_e$ of the engine 10 that extends in the longitudinal direction. A flow path for working medium gases (e.g. air) 18 extends axially through these sections 12, 14, and 16 of the engine 10. Preferably, the combustor 14 is an annular combustor and the following description will apply to the annular type of combustor. The turbine section 16 includes a high pressure rotor 20. It is noted with respect to FIG. 2 that the use of an engine having a twin spool is for illustrative purposes only and is not a limitation of the instant invention.

Figure 3:
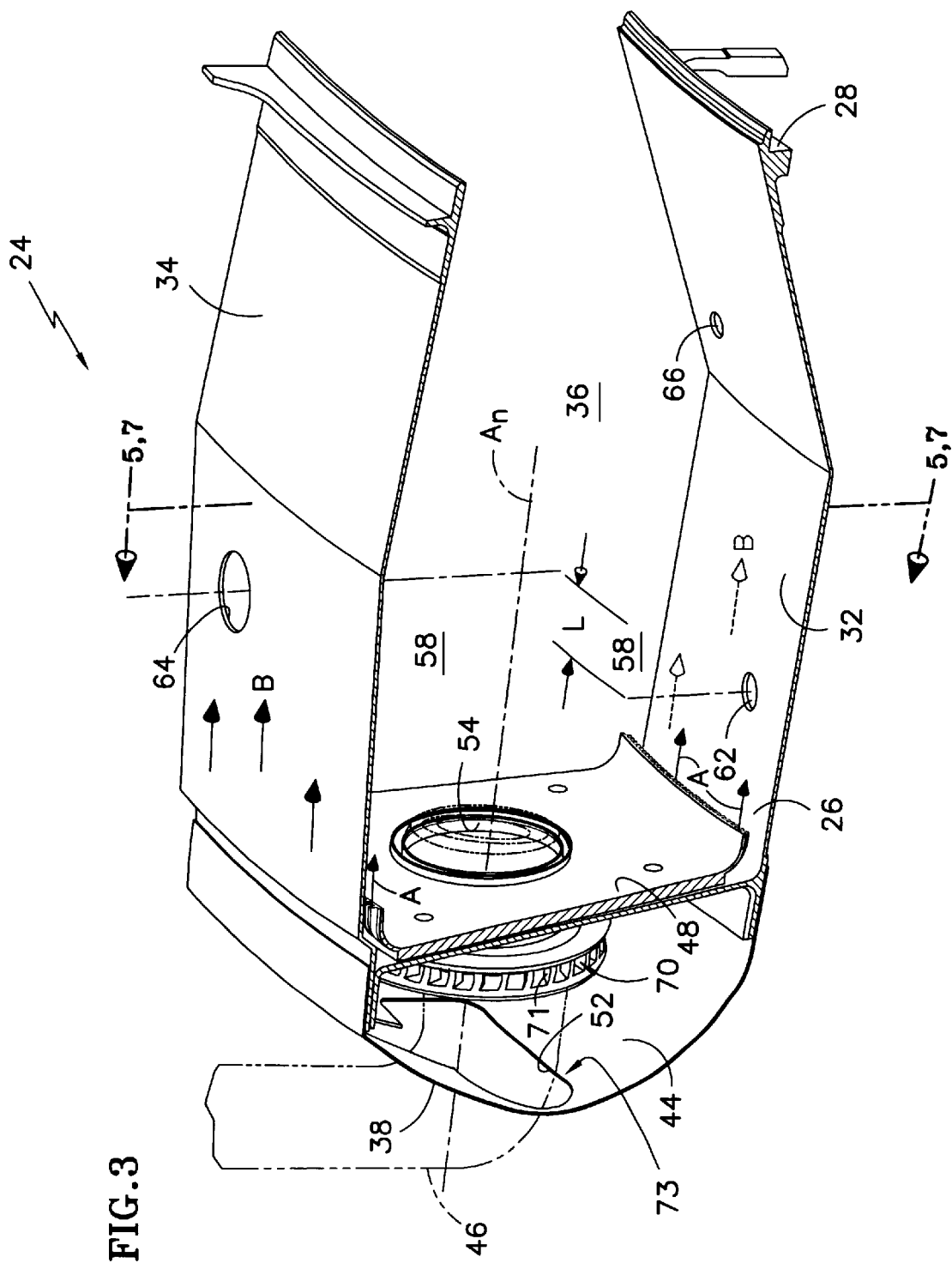
FIG. 3 is an isometric side elevation, schematic view of a combustion chamber of the present invention having a bulkhead for use in the gas turbine engine of FIG. 2 including apertures within the outer and inner liners.

Referring now to FIGS. 2 and 3, the combustor 14, having a combustion chamber 24 and a combustion hood (hood) 38, will be further described. FIG. 3 is an isometric, schematic view of the combustor chamber 24 of FIG. 2 where the combustion hood is partially broken away to show the relationship of several components which are disposed adjacent to each fuel nozzle 46.

The combustion chamber 24 has an upstream end 26 and a downstream end 28 and is preferably annular. The combustion chamber 24 includes an inner annular liner (inner liner) 32 which extends circumferentially about the axis $A_e$ of the engine. An outer annular liner (outer liner) 34 is radially spaced from the inner liner 32 leaving a combustion zone 36 therebetween. The combustion zone 36 is disposed between the upstream end 26 and the downstream end 28. The annular combustion chamber 24 also includes an annular combustion hood 38 at the upstream end 26 of the combustion chamber 24 and a radially extending bulkhead 48 (FIG. 3) which is spaced axially from the combustion hood 38 leaving a supply region 44 therebetween for supplying air to the combustion zone 36.

A plurality of fuel nozzles (nozzles) 46 are spaced circumferentially about the interior of the engine 10. Some of the fuel nozzles 46 include a spark igniter 68 (FIG. 2). Further, each fuel nozzle 46 extends into the combustion hood 38 and through the bulkhead 48 to deliver fuel to the combustion zone 36 to the interior of the combustion chamber 24. Located at the downstream end 28 and at the exit of the combustor chamber 24 is an annular array of first stage turbine vanes (vanes) 30 (FIG. 2) through which the combustion gases pass upon entering the turbine section 16.

Figure 4:
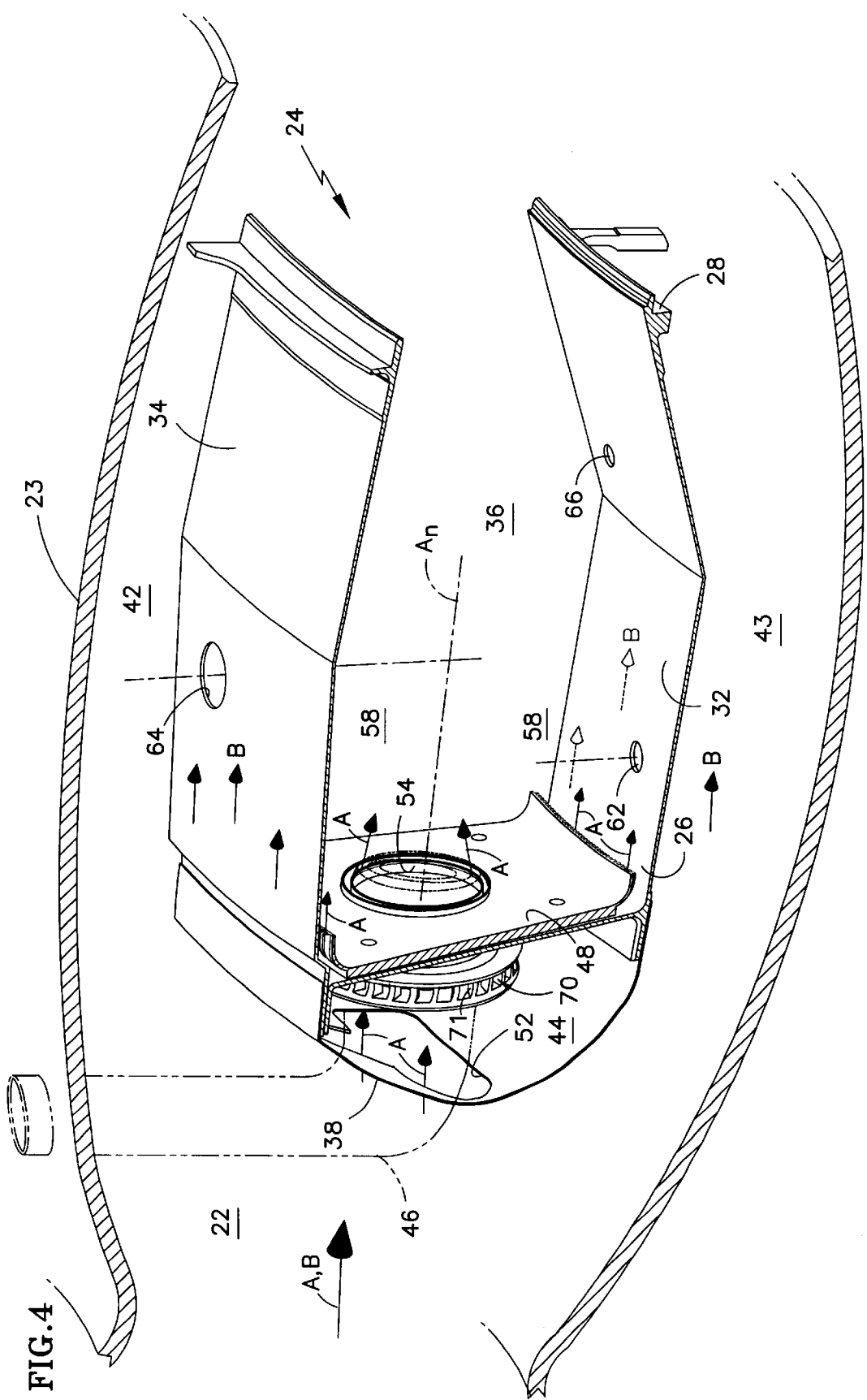
FIG. 4 is partial isometric view of a diffuser and the combustion chamber of FIG. 3.

Referring now to FIGS. 3 and 4, the combustion chamber 24 is more fully described. FIG. 4 shows the combustion chamber 24 with a diffuser casing (diffuser) 23.

As is understood by those skilled in the art, the combustion hood 38 has a plurality of circumferentially spaced openings 52. The bulkhead 48 also includes a plurality of openings 54. The openings 54 in the bulkhead 48 are axially aligned with the openings 52 in the combustion hood 38 for permitting insertion of the fuel nozzles 46 into the combustion zone 36. Each opening 54 in the bulkhead 48 has an axis $A_n$. The axis $A_n$ extends through the centerline (longitudinal axis) of the fuel nozzle 46. Each fuel nozzle 46 is received in a swirler, generally shown at 71, which is aligned with the opening 54 in the bulkhead 48. The swirler 71 includes a plurality of air swirler vanes 70 which serve to introduce combustion air and fuel into the combustion zone 36. For the purposes of this document, a fuel injector, shown generally at 73, preferably includes the swirler 71 and the fuel nozzle 46.

The inner and outer liners 32, 34 are fixed at the upstream end 26 of the combustion chamber 24 and enclose this portion of the combustion zone 36. The inner and outer liners 32, 34 are connected at the downstream end 28 of the combustion chamber 24 to the vanes 30. Apertures 62, 64 are used to promote thorough mixing of the air and fuel within the combustion chamber 24. Preferably, the apertures 62, 64 are located in an upstream region 58 of the combustion chamber 24. Although the exemplary embodiment does not include the use of a dilution hole 66, it is noted and within the scope of this invention that one or more dilution holes 66 may also be used in the inner and outer liners 32, 34.

The combustion process and flow of air within the combustion chamber 24 will now be further explained in relation to the fuel injector 73 and the apertures 62, 64.

As air leaves the compression section 12 (FIG. 2) and prior to entering into the combustor 14 (FIG. 2), the air enters the diffuser 23. The diffuser 23 prepares the air for entry into the combustion section 14 (FIG. 2) at low velocity to permit proper mixing with the fuel. The diffuser 23 extends circumferentially about the axis $A_e$ of the engine. The air that is received into the diffuser 23 enters the plenum 22 for distribution through the combustor 14. A portion of the air within the plenum 22 flows through openings 52 and enters the supply region 44 upstream of the combustion zone 36, as indicated by arrows A in FIGS. 3 and 4. A portion of the air that does not flow into the supply region 44, flows instead around the exterior of the inner and outer liners 32, 34 as indicated by the arrows B in FIGS. 3 and 4.

The air that enters the bulkhead supply region 44 is swirled by the swirler vanes 70 of the swirler 71 in a counter-clockwise direction, by way of example. The air is swirled at the point of injection of the fuel from the swirler 71. The swirler vanes 70 swirl the air and promote mixing of the fuel and the air. The fuel is injected from the fuel nozzle 46 into the combustion zone 36 in the form of conical jets (annulus) that is then mixed with the swirled air to form a fuel and air spray. The spray swirls about the centerline, $A_n$, and forms a conical shape expanding outward as the spray promulgates into the combustion zone 36 towards the downstream end 28. Thus, mixing of the air and fuel is promoted in the upstream end 26 of the combustion chamber 24 about the axis $A_n$ of the fuel nozzles 46. Further, it is understood that one skilled in the art may employ similar methods to provide a swirling of the fuel and air mixture into the upstream end 26 of the combustion chamber 24 through the opening 54 or, alternatively, a plurality of similar openings.

Further, to assist in the combustion process, additional air is required within the combustion zone 36. The source for this additional air is that portion of the air that flows around the exterior of the combustion chamber 24, as indicated by the arrows, B shown in FIG. 4. This air flows between the diffuser 23 and the inner and outer liners 32, 34. More specifically, the diffuser 23 and the outer liner 34 define an outer diameter supply region 42. Similarly, the diffuser 23 and the inner liner 32 define an inner diameter supply region 43. The outer diameter supply region 42 supplies air to cool the outer liner 34 and to the vanes 30. The inner diameter supply region 43 supplies air to cool the inner liner 32, the rotor 20 (FIG. 2) and the vanes 30.

A portion of this air in the supply regions 42, 43 also supplies air to the apertures 62, 64 and, if present, dilution holes 66. In this way, this additional air is emitted into the combustion zone 36 via a plurality of circumferentially disposed apertures 62, 64 located in the inner and outer liners 32, 34, respectively. The apertures 62, 64 are employed to supply additional air (air jets) to complete combustion and establish a tolerable maximum temperature level at the downstream end 28 of the combustion chamber 24.

An alternative embodiment of the present invention includes the addition of a dilution hole 66 within the inner liner 32 as shown in FIG. 3. Dilution hole 66 supplies additional air proximate to the downstream end 28 of the combustion chamber 24 to complete combustion and establish a tolerable maximum temperature level at the downstream end 28 of the combustion chamber 24. It is noted that some of this air may flow through additional apertures (not shown) located in the inner and outer liners 32, 34 to further cool the inner and outer liners 32, 34 and assist in the combustion process.

Figure 5:
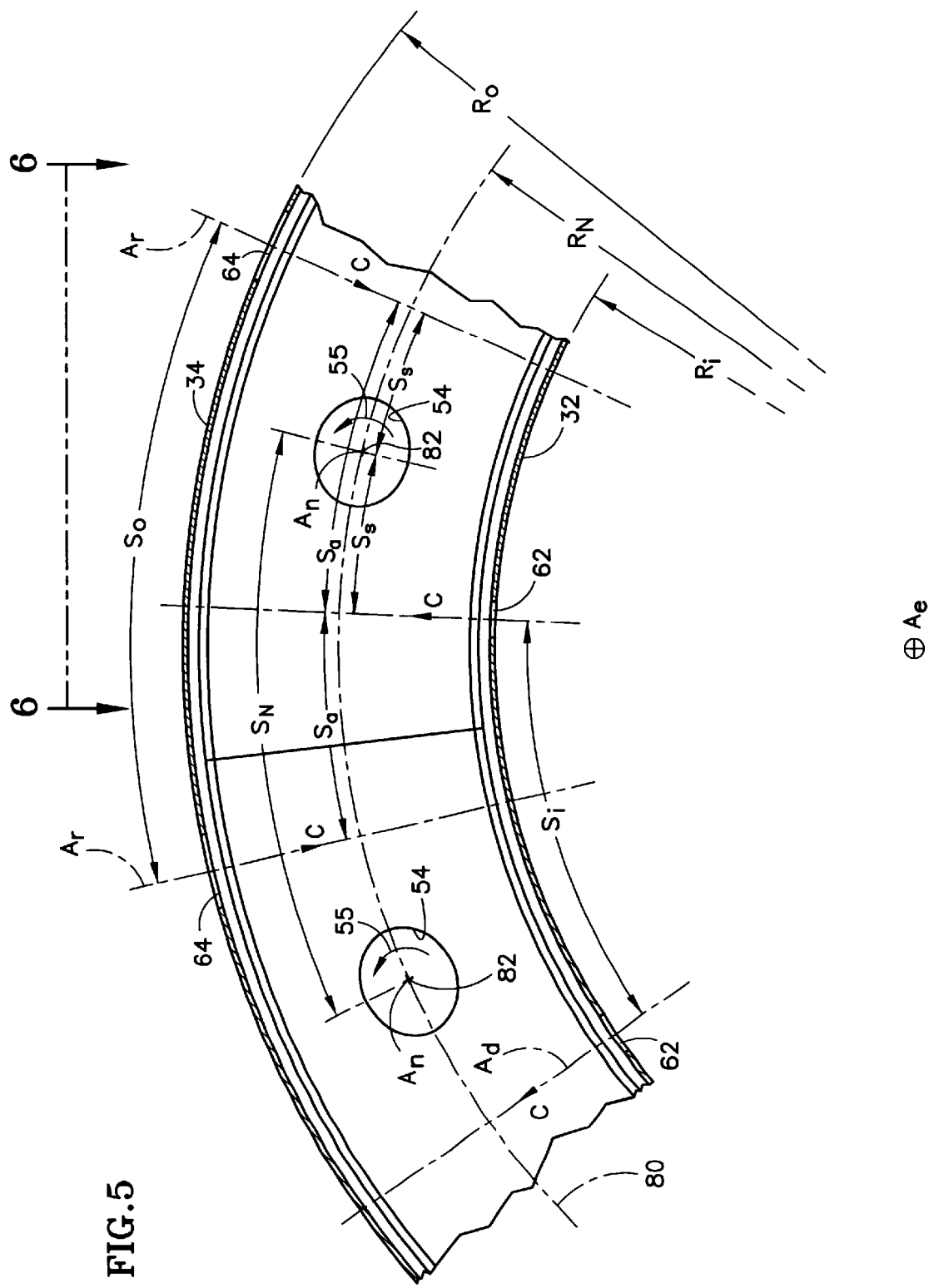
FIG. 5 is a partial aft view taken along 5—5 of FIG. 3 of the combustion chamber.
Figure 6:
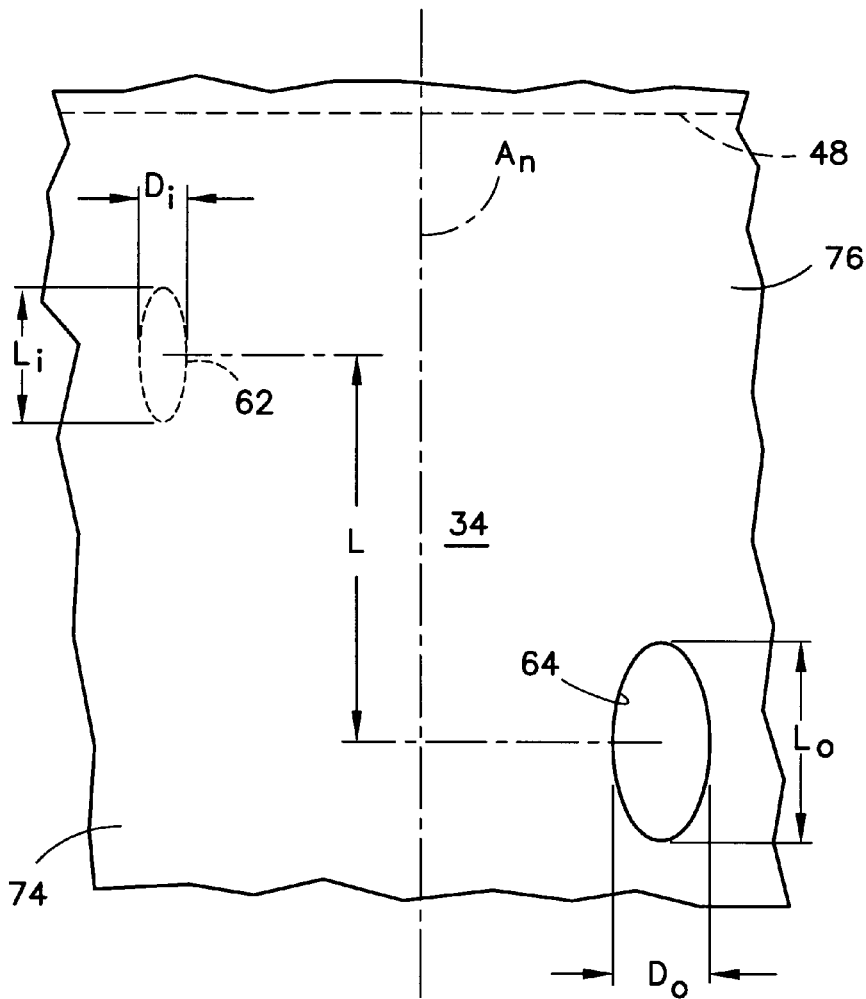
FIG. 6 is a partial top plan view of the combustion chamber of FIG. 4 taken along 6—6 of FIG. 5 including alternative geometric configuration for the apertures.

Referring now to FIGS. 3, 5, and 6, the preferred pattern of apertures 62, 64 within the inner and outer liners 32, 34 relative to the each of the fuel injectors 73 (FIG. 2) will now be detailed. FIG. 5 shows a partial aft view of the combustion chamber 24 taken along direction 5—5 of FIG. 3. FIG. 6 is a partial top plan view of the combustion apparatus 24 of FIG. 4 taken along 6—6 of FIG. 5.

It can be seen from FIG. 6, that aperture 64 is positioned generally downstream or away from the bulkhead 48 relative to the aperture 62. However, it is understood by those skilled in the art and within the scope of this invention, that the aperture 64 may be positioned more upstream than aperture 62 based on the specifics of the combustor 14 (FIG. 2) design.

The pattern of the apertures 62, 64 within the inner and outer liners 32, 34, respectively, for the combustor 14 (FIG. 2) will now be described. It is preferred that the inner liner 32 has a circumferential row of apertures 62 and that the outer liner 34 has a circumferential row of apertures 64. Further, and as shown in FIGS. 5 and 6, the apertures 64 are circumferentially positioned within the outer liner 34 such that there is only one aperture 64 between each of the fuel injectors 73. Similarly, the apertures 62 are circumferentially positioned within the inner liner 32 such that there is only one aperture 62 between each of the adjacent fuel injectors 73. In other words, the aperture 64 is positioned to one side 76 (FIG. 6) of the axis $A_n$ while the aperture 62 is positioned to an opposing side 74 (FIG. 6) of the axis $A_n$.

The preferred pattern of the apertures 62, 64 will now be further described. A radial axis, $A_r$, extends through the center of each of the apertures 64 as shown in FIG. 5. Similarly, a radial axis, $A_r$, extends through the center of each of the apertures 62. The circumferential or arc spacing between adjacent apertures 64 along the outer liner 34 is $S_o$.

The arc spacing, $S_o$, is measured from the centerline, $A_r$, of each aperture 64 to the centerline $A_r$ of each adjacent aperture 64. Similarly, the circumferential or arc spacing between adjacent apertures 62 positioned within the inner liner 32 is $S_i$. The arc spacing $S_i$ is measured from the centerline, $A_r$, of each aperture 62 to the centerline, $A_r$, of each adjacent aperture 62. The subscript i refers to the location in the inner liner 32 and the subscript o refers to the location in the outer liner 34. The radial distance from the engine centerline, $A_e$, to the inner and outer liners 32, 34, is defined as radii $R_i$ and $R_o$, respectively.

Since there is one aperture 64 for every fuel injector 73 positioned within the opening 54 (FIG. 4), the preferred arc spacing, $S_o$, between adjacent apertures 64 is defined as $[2\pi R_o]/N$ where N is the number of fuel injectors 73. Likewise, since there is one aperture 62 for every fuel injector 73, the preferred arc spacing, $S_i$, between adjacent apertures 62 is defined as $[2\pi R_i]/N$. Finally, the preferred arc spacing between adjacent fuel injectors 73, or the injector spacing, $S_N$, is defined as $[2\pi R_N]/N$ where $R_N$ is the radial distance from $A_e$ to $A_n$, as shown in FIG. 5. Most preferably, the arc spacing, $S_a$, between adjacent apertures 62, 64 is equal to approximately about one-half the injector spacing, $S_N$. Also, most preferably, the arc spacing, $S_s$, between adjacent apertures 62, 64, from the center axis, $A_n$ of each fuel injector 73 is equal to approximately about one-quarter the injector spacing, $S_N$. The arc spacing $S_a$, $S_s$ is measured along an arc, 80, that passes through the centers 82 of the openings 54. The pattern of apertures 62, 64, as described hereinabove, results in a beneficial non-uniform flow distribution of the air jets emitted from the apertures 62, 64 that reduces the peak temperatures within the combustion zone 36 (FIG. 3) and provides an enhanced, uniform exit temperature distribution.

It is noted that the path that the fuel/air mixture travels within the combustion chamber 24 is not restricted by the air jets, due to the arc spacing $S_a$, between each aperture 62 and each aperture 64. This arc spacing results in increased residence time of the fuel/air mixture (spray). The residence time is the time from when the fuel is emitted from the fuel nozzle until it reaches the combustion jets emitted from the apertures 62, 64.

It is also noted that the shape of the combustion zone 36, the axial location of the apertures 62, 64, and the relative pressure drops within the supply regions 42, 43, all contribute to determine which of the air jets emitted from the respective apertures 62, 64 traverse the combustion chamber 24 first. The hot gases from the upstream end 26 of the combustor tend to wrap around the air jet that penetrates first, further increasing the combustion temperature and creating a hotter zone at the downstream end 28 in line with the respective air jet. It is understood by those skilled in the art that the aperture that will inject air first into combustion chamber 24 is a function of the combustion chamber design and the pressure distribution within the combustion section 14 (FIG. 2). Thus, to reduce the temperatures in this hot zone, it is preferred that the air jet from the aperture that penetrates first, injects more cooling air than the air jet from the aperture that penetrates later. One way to accomplish the injection of more cooling air from an aperture is to increase its area. Thus, in the preferred embodiment and based on the combustor design and testing, the aperture 64 injects first and therefore has a greater area than that for the aperture 62. Thus, the air jet from the aperture 64 adds a relatively large amount of cooling air into the combustion chamber 24 that traverses the combustion chamber 24 and splashes onto the inner liner 32 which advantageously reduces the average temperature near the inner diameter of the rotor. The reduction of the temperatures near the inner diameter of the rotor is a preferred turbine requirement in order to minimize high gas temperatures to the turbine vanes downstream of the combustion chamber 24.

Thus, it is understood by those skilled in the art and within the scope of this invention that the areas of the apertures 62, 64 are sized based on the specific combustor design and the turbine requirements.

Figure 6A:
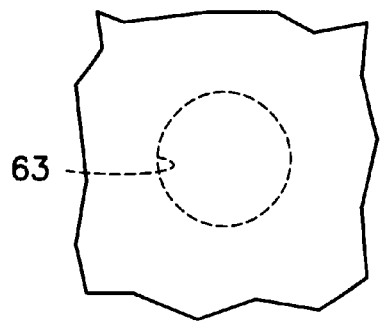
Figure 6B:
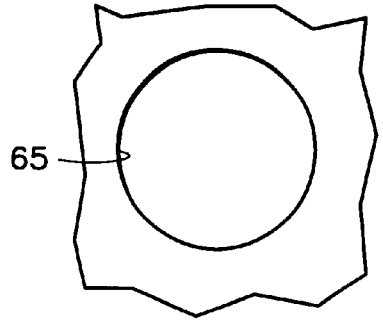

Preferably, and as shown in FIGS. 5 and 6, the apertures 62, 64 are elliptical in shape. Each of the apertures 62, 64 has a major axis, $L_i$, $L_o$, respectively, that is along the longitudinal axis of the combustor 14 (FIG. 2) and a minor axis, $D_i$, $D_o$, respectively, that is perpendicular to the longitudinal axis of the combustor 14 (FIG. 2). Once again, subscript i refers to the location in the inner liner 32 and the subscript o refers to the location in the outer liner 34. However, it is noted and within the scope of this invention that the apertures 62, 64 may also have various geometric configurations such as, for example, circular shapes 63, 65 (FIGS. 6A and 6B). Preferably, the ratios of $S_i/D_i$ and $S_o/D_o$ are each approximately about greater than four, and most preferably approximately about 4. However, it is within the scope of this invention and understood by one skilled in the art that the ratios of $S_i/D_i$ and $S_o/D_o$ can vary depending on the specific combustor thermal and mechanical design.

Figures 7, 8:
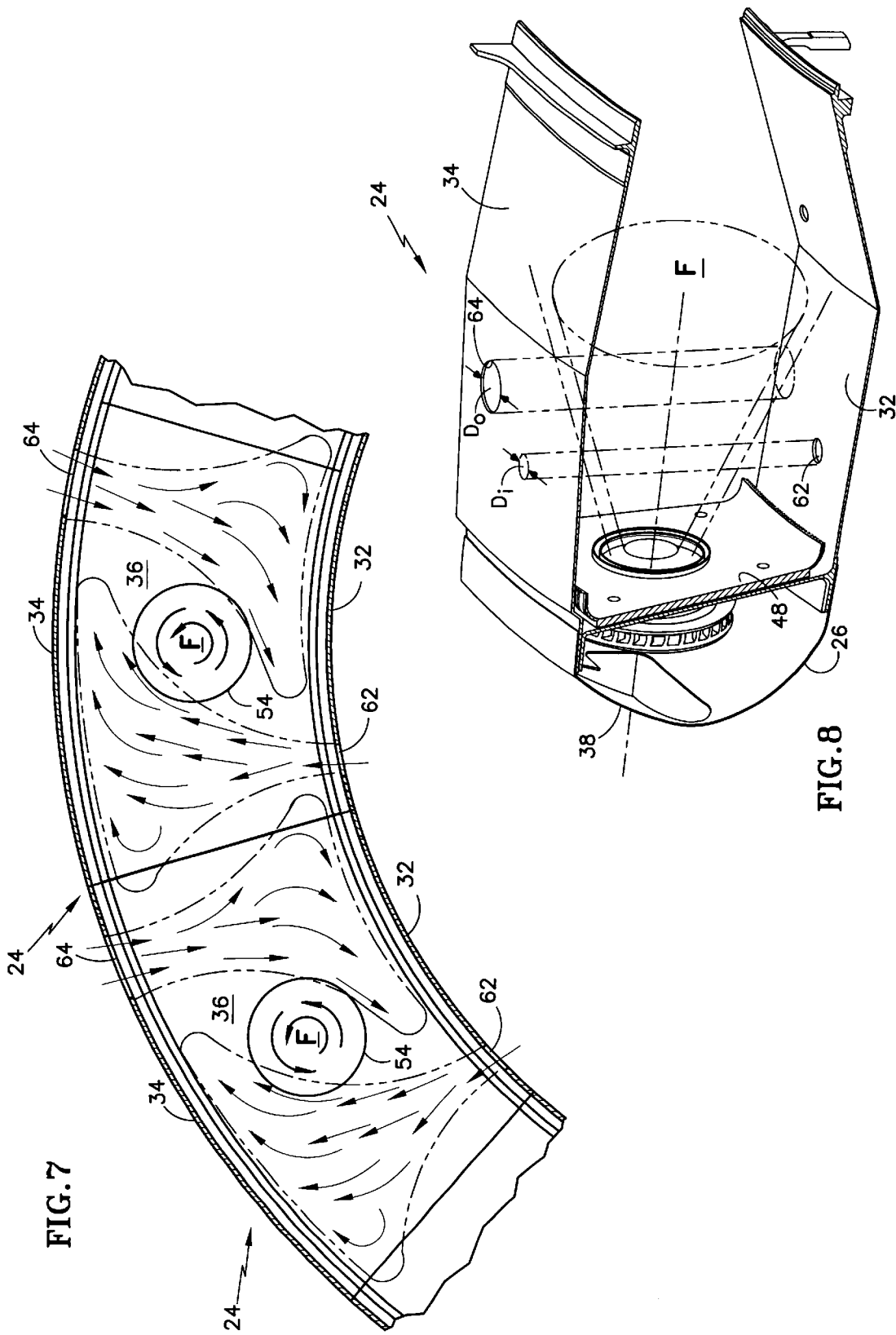
FIG. 7 is a partial isometric view taken along 7—7 of FIG. 3 of the bulkhead of FIG. 3 showing the development of the fuel cone and its interaction with the air jets.
FIG. 8 is a partial front view of the combustion chamber of FIG. 3.

Referring now to FIG. 7, the advantage of the features of the apertures 62, 64 discussed hereinabove will be discussed below in the context of the operation of the combustor 14 (FIG. 2). FIG. 7 shows a partial front cross sectional view taken along 7—7 of FIG. 3 of the combustion chamber 24 (FIG. 3) showing the development of the fuel spray, F, and its interaction with the air jets. The view is taken downstream of the apertures 62, 64.

In developing the exit temperature pattern, the hot combustion gases from the injector 73 (FIG. 3) will regularly favor one side of the combustion chamber 24 over the opposing side, thus making that side burn hotter. It is known and understood by those skilled in the art and within the scope of this invention that the jet flow from the apertures 62, 64 can be sized by designing the area of the apertures 62, 64 to shift the flow from the cooler side to the hotter side as the combustion operations dictate.

Another consequence of the features of the present invention already discussed and shown in FIG. 7, is that the air jet emitted from each aperture 62 does not directly oppose the air jet emitting from each corresponding aperture 64 for a given fuel injector 73 (FIG. 4). As a consequence of the axial positioning and the ratios $S_1/D_i$ and $S_o/D_o$ of the apertures 62, 64, the air jets emitted from the apertures 62, 64 enter into the combustion chamber 24 and splash or impinge onto the opposing inner wall of the outer and inner liners 34, 32, respectively. This provides full penetration of the air jets into the combustion chamber 24. As shown in FIG. 7, the positioning and configuration of the apertures 62, 64 provide complete coverage of the inner and outer liners 32, 34 thereby helping cool the inner and outer liners 32, 34.

Further, the air jets emitted from the apertures 62, 64 preferably enter the combustion chamber 24 in a direction that opposes that of the rotation of the fuel/air mixture emitted from the fuel injector 73. This 'counter rotation' between the spray emitted from injector 73 and the air jets emitted from the apertures 62, 64 enhances mixing of the air jets with the fuel/air mixture thus providing a more uniform temperature distribution in the combustion chamber 24. In this way, the apertures 62, 64 act as airfoils (vanes) in that the air jets emitted therefrom turn in upon entering the combustion chamber 24 in a direction that opposes the combustion gases. As discussed previously, the swirler 71 preferably imparts a counter-clockwise turn to the fuel/air mixture while the air jets from the respective apertures 62, 64 preferably imparts a clockwise turn to the air jets emitted therefrom. That is to say, the air jets turn in clockwise upon interaction with the counter-clockwise spray and consequently, wrap around the spray (fuel cone) providing an enhanced mixing environment. This assists in the avoidance of hot streak formation in the inner and outer liners 32, 34.

Referring back to FIG. 5, it is understood by those skilled in the art and within the scope of this invention that the placement of the apertures 62, 64 within the respective inner and outer liners 32, 34 depends upon the rotation of the fuel and air due to the swirler 71. For example, FIG. 5 depicts the swirl 55 from the opening 54 to be anticyclonic (counter-clockwise) when viewed in the direction 4—4 of FIG. 3. Therefore, apertures 62, 64 are appropriately displaced in the axial and circumferential directions relative to the opening 54 so that the angular momentum imparted by the respective air jets onto the working combustion gases within the combustion chamber 24 is in the opposite direction (clockwise) of that of the swirl 55. Therefore, one can choose the orientation of the swirl to be opposite to the orientation of the air jets to provide a generally equivalent aerodynamic condition.

Referring now to FIGS. 7 and 8, yet another advantage of the present invention is shown. FIG. 8 is a partial front view of the combustion apparatus 24 of FIG. 3.

As shown in FIG. 8, the air jets emitted from the apertures 62, 64 is of a quantity and corresponding velocity such that the cool air of the air jets is placed in the path of the hot air issuing from the swirler 71. In other words, the net effect of the apertures 62, 64 is to create a volume of cool gases directly in line with the hot gases generated at the upstream end 26 of the combustion chamber 24. Thus, mixing is promoted, hot streaks are eliminated and additional cooling is provided to the inner and outer liners 32, 34.

Also, since the air jets traverse the combustion gas path, as previously described herein, the flow of the fuel/air mixture is restricted by the air jets of the apertures 62, 64. This restriction has the effect of increasing the velocity of the cross flow of the combustion gases that travels from the upstream end 26 of the combustion chamber 24 to the downstream end 28. However, since there is only one aperture 62, 64 per one side of the fuel injector 73 (FIG. 3), the air jets that traverse the combustion gas path are not impeded from doing so despite the increase in velocity of the cross flow. It is noted that the preferred aperture patterns permits this balance between the quantity of cool air necessary to traverse the combustion gas path and the acceleration of the cross flow that must be overcome by the air jets in order to traverse the combustion gas path.

As previously noted, the apertures 62, 64 are preferably elliptical shaped. As earlier pointed out in reference to FIG. 6, the major axes $L_i$ and $L_o$ are along the longitudinal axis of the combustor 14 (FIG. 2). Elliptically shaped apertures provide enhanced penetration of the air jets into the combustion chamber 24 since the cross sectional strength is greater along the respective major axes. Also, the conical flow from the fuel injector 73 (FIG. 3) and the shape of the air jet cross-section tends to impart lift to the air jets. This effect results in the air jets twisting normal to its original orientation, arrows C (FIG. 5), as it splashes onto the opposing liner wall resulting in an enhanced uniform distribution of jet flow along the respective liner wall.

A further advantage of the present invention is also shown in FIG. 8. The fuel injectors 73 (FIG. 3) are preferably chosen so that their fuel distribution matches with the air jets of the apertures 62, 64. In other words, the footprint of the spray, F, relative to the total jet width as defined by the respective minor axes of apertures 62, 64, is optimized to improve mixing. That is to say, preferably, the respective minor axes $D_i$ and $D_o$ of apertures 62, 64 fall within the footprint of the spray, F as shown in FIG. 8.

Referring now back to FIG. 3, it is also within the scope of this invention, that if the simultaneous requirements of peak temperature reduction and uniform temperature profile at the exit plane can not be optimized by the adjustment of flow between apertures 62, 64, then one or more dilution apertures 66 can be employed in the inner and outer liners 32, 34.

The dilution hole 66 may be employed, preferably in the inner liner 32, to facilitate a reduction in the average temperature at a zero percent span of the combustion chamber 24 exit (radial direction). The zero percent span for the exit plane is located at the downstream end 28 of the combustion chamber 24, proximate to the inner liner 32. That is to say, the average temperature near the inner liner 32 proximate to zero percent span is reduced. It is within the scope of this invention and understood by those skilled in the art, that the number and placement of the dilution hole 66 is based on a reduction of the temperature at zero percent span. This alternative embodiment, when used with the apertures 62, 64, provides enhanced flexibility to reduce the average temperature profile in the combustion chamber at zero percent span.

Figure 1:
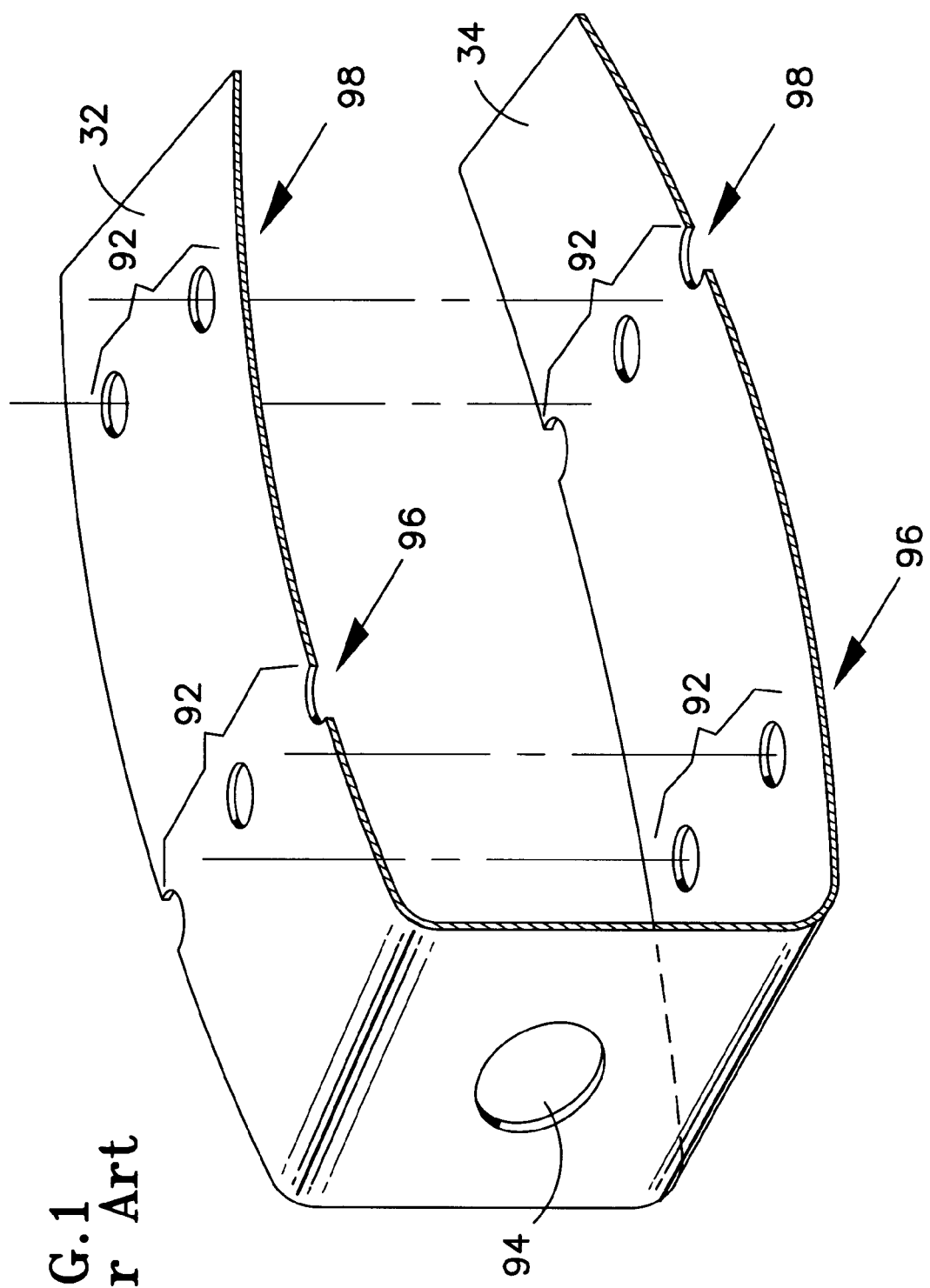
FIG. 1 is an isometric view of a combustion chamber having an inner and outer liner with a typical prior art aperture pattern.
Figure 9:
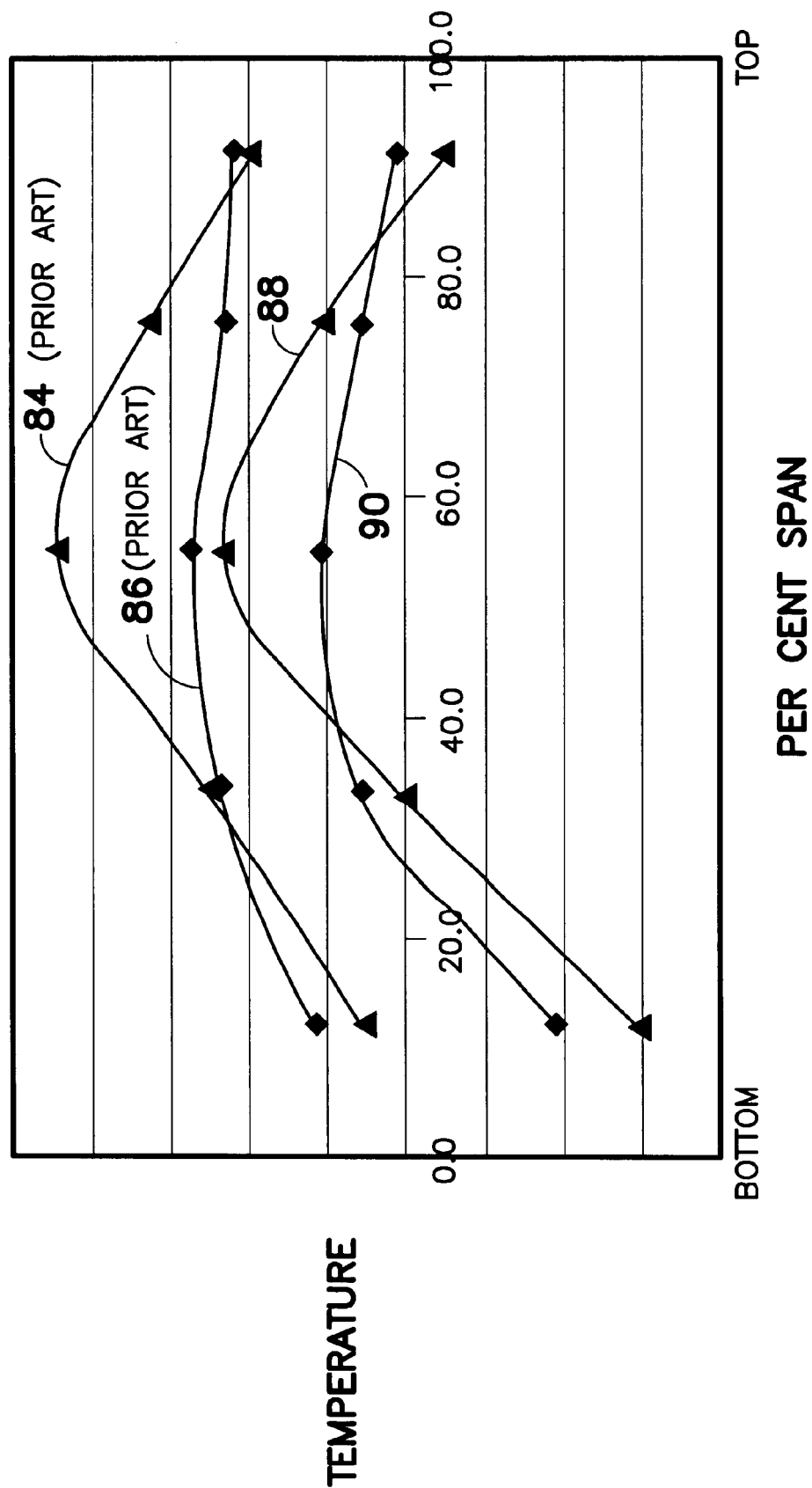
FIG. 9 is a graphical representation of the maximum and average temperature profiles versus the percent span at the exit plane of the combustion chamber of FIG. 3.

FIG. 9 demonstrates the results of an actual full annular rig test that compares the maximum and average temperature profiles versus the percent span along the exit plane of the combustion chamber 24 for both the configuration, as taught by this invention, and the conventional prior art configuration. The prior art configuration, shown previously in FIG. 1, consists of first and second rows 96, 98 of apertures 92 located in each of the inner and outer liners, 32, 34, respectively. The apertures 92 may have various diameters and are located in the outer and inner liners such that they are symmetrical with respect to an aperture 94 through which the fuel nozzle (not shown) is placed. Curves 84 and 86 represent the maximum and average temperature profiles, respectively for the prior art configuration. Curves 88 and 90 represent the maximum and average temperature profiles, respectively of the invention disclosed herein with elliptically shaped apertures. As is evident from FIG. 9, the invention disclosed herein shows an advantageous reduction in both maximum and average temperature profiles at the exit plane.

Referring back to FIGS. 2 and 3, the combustion chamber 24 discussed hereinabove provides for a combustion apparatus 24 for a gas turbine engine 10 with enhanced mixing of the combustion gases within the combustion chamber 24. The air jets emitted from the apertures 62, 64 penetrate into the combustion chamber 24 advantageously provide cooling of the inner and outer liners 32, 34, the avoidance of hot streaks, and the enhanced mixing of the fuel/air mixture. This is made possible by the aperture pattern that results in a nonuniform flow distribution of the air jets into the combustion chamber 24, as described herein. Further, the increase in the surface area of the air jets emitted from the apertures 62, 64, as well as the spacing between apertures 62, 64 increases the mixing and the residence time of the combustion process. This facilitates a reduction in peak temperature and a uniform temperature distribution at the downstream end 28 of the combustor 14 (FIG. 2). The features of the present invention further provide an operational environment that enhances the durability for the first stage turbine vane 30 and rotor 20. Finally, in the preferred embodiment, the apertures 62, 64 are elliptical in shape permitting the air emitted from the apertures 62, 64 to fully penetrate across the cross section of the combustion chamber 24 and splash onto the opposing outer and inner liners, 64, 62, respectively, eliminating hot streaks and further cooling the inner and outer liners 32, 34.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the invention, but that the invention will include all embodiments falling within the scope of the appended claims.

We claim:

1. A gas turbine combustion apparatus comprising:
   an annular combustion chamber having an upstream end, said annular combustion chamber including:
      an inner liner, and
      an outer liner coaxially disposed relative to each other, said inner and outer liners define a combustion zone;
   a plurality of fuel injectors at said upstream end, each of said plurality of fuel injectors having a longitudinal axis and configured to swirl the fuel and air mixture injected therefrom in a predetermined direction about said longitudinal axis;
   a plurality of first apertures disposed circumferentially in said inner liner in an upstream region thereof for entry of air, the air exhausted into said combustion zone; and
   a plurality of second apertures disposed circumferentially in said outer liner in an upstream region thereof for entry of air, the air exhausted into said combustion zone;
   each of said first apertures being angularly offset in a circumferential direction from the closest of each of said second apertures so that said plurality of first apertures and said plurality of second apertures are disposed substantially on opposite sides of said longitudinal axis of each of said plurality of fuel injectors,
   wherein said first apertures are the only apertures in said inner liner, said second apertures are the only apertures in said outer liner, such that the air exhausted from said first apertures into said combustion zone and the air exhausted from said second apertures into said combustion zone do not directly oppose each other but instead impinge onto said respective opposing outer and inner liners.

2. The apparatus of claim 1, wherein the air exhausted from said plurality of first apertures and said plurality of second apertures opposes said direction of swirl of the fuel and air mixture.

3. The apparatus of claim 2, wherein said plurality of first apertures is proximate said upstream end and said plurality of second apertures disposed downstream of said plurality of first apertures.

4. The apparatus of claim 2, wherein said plurality of second apertures having a cross-sectional area larger than a cross sectional area of said plurality of first apertures and the air ejected from said second apertures into said combustion zone is ejected prior to the air ejected from said first apertures.

5. The apparatus of claim 1, wherein each of said first and second apertures have a circular cross section.

6. The apparatus of claim 1, wherein said annular combustion chamber having a longitudinal axis and said plurality of first and second apertures have elliptical cross sections with major axes, said major axes are disposed generally along said longitudinal axis of said annular combustion chamber for maximum penetration of the air as the air impinges onto said inner and outer liners.

7. The apparatus of claim 6, wherein said apertures of said plurality of first apertures having equal circumferential spacing therebetween and said apertures of said plurality of second apertures having equal circumferential spacing therebetween.

8. The apparatus of claim 7, wherein said plurality of first apertures each having a first minor axis and the ratio of the circumferential spacing of said plurality of first apertures to the length of the first minor axis is greater than or equal to about four, and said plurality of second apertures each having a second minor axis and the ratio of the circumferential spacing of said plurality of second apertures to the length of the second first minor axis is greater than or equal to about four.

9. The apparatus of claim 1, wherein each of said cross sectional area of said plurality of first apertures is different than each of said cross sectional area of said plurality of second apertures.

10. The apparatus of claim 9, wherein each of said cross sectional area of said plurality of first apertures is smaller than each of said cross sectional area of said plurality of second apertures.

11. The apparatus of claim 1, wherein said annular combustion chamber includes a dilution aperture.

12. The apparatus of claim 11, wherein said annular combustion chamber includes a downstream end and said dilution aperture is located within said inner liner proximate to said downstream end.

* * * * *